United States Patent Office 2,734,382
Patented Feb. 14, 1956

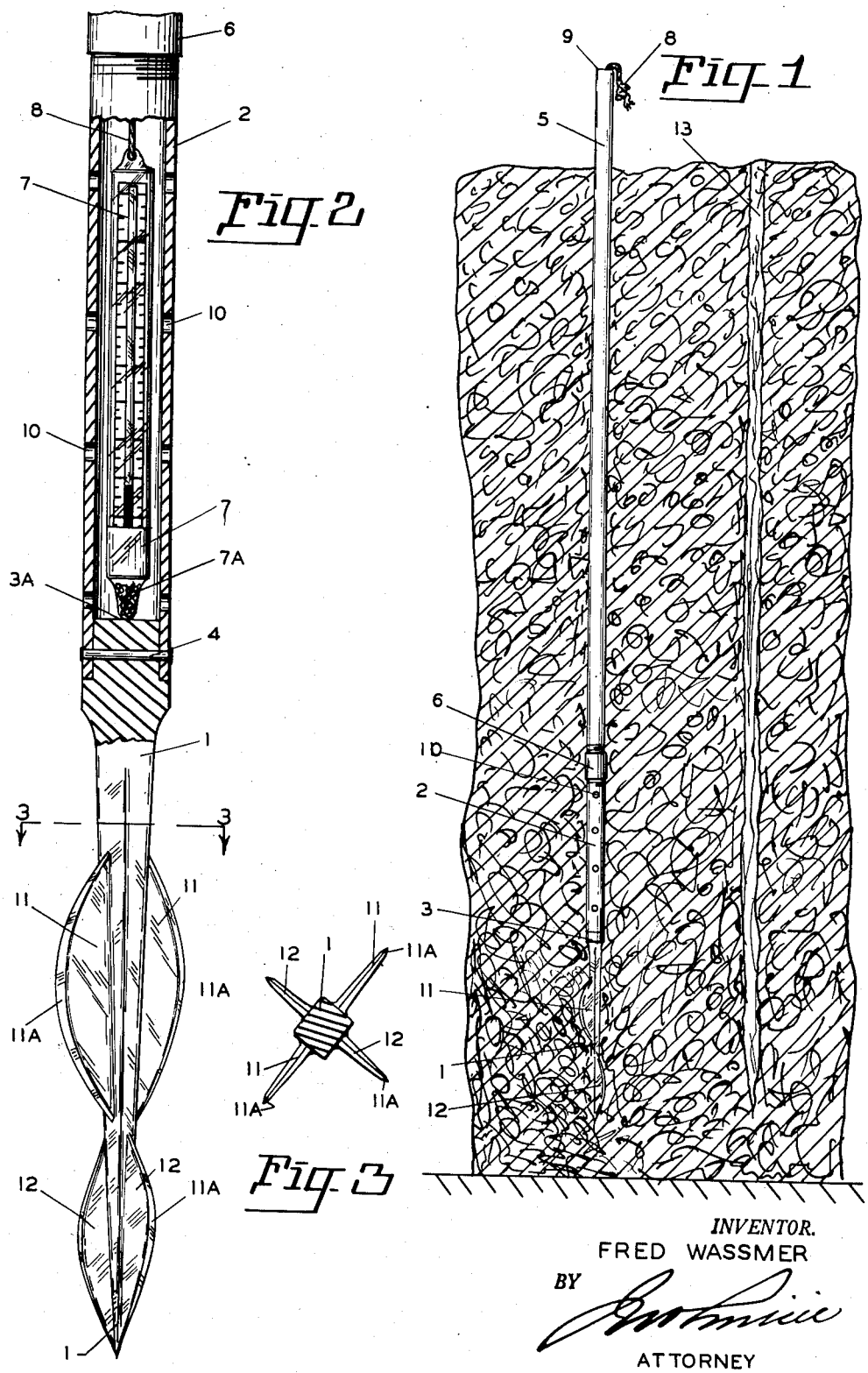

2,734,382

DEVICE FOR TAKING THE TEMPERATURE OF FIBROUS MATERIAL

Fred Wassmer, Tillamook, Oreg.

Application October 14, 1952, Serial No. 314,697

1 Claim. (Cl. 73—352)

My invention relates to a device for taking the temperature of fibrous material, and particularly for taking the temperature of hay in hay mows or stacks.

In hay mows or stacks, considerable trouble has been encountered by the heating of the hay, and in many cases the heat has developed to a point where the material actually catches fire burning down barns. Heretofore the hay had to be moved allowing the same to cool off, but with my temperature device the temperature can be taken of the hay, and by driving the device down into the hay ventilating shafts are formed, allowing the heat to escape without moving the hay.

The primary object of this invention is to provide a device for penetrating into fibrous material, having a thermometer removably located therein for taking the temperature of the material, as for instance hay in hay mows or stacks.

Another object of the invention is the providing of a device for punching holes into hay so that the hay will cool or ventilate up through the openings made by the device.

These and other incidental objects will be apparent in the drawings, specification and claim.

Referring to the drawings:

Figure 1 illustrates my new and improved temperature taking device, having penetrated into a fibrous material, such as hay, for taking a temperature reading. This view also illustrates the hole left in the material providing means for ventilating the material.

Figure 2 is an enlarged view of the lower end of the device showing the spear for cutting the material, partly broken away illustrating the location of a thermometer within the device.

Figure 3 is a sectional view, taken on line 3—3 of Fig. 2, illustrating the cutter blades associated with the point of the device.

Referring more specifically to the drawings:

My new and improved temperature taking device consists of a tapered point 1 connected to a hollow body portion 2 as being inserted in the said body at 3 and held therein by the cross pin 4, although the point 1 can be connected by any suitable method to the body member 2.

A hollow handle or extension 5 is threadably connected to the body member 2 by the coupler 6 or by any other method. The length of the handle may vary depending upon the depth that the device has to penetrate into the material.

A thermometer 7 may be inserted within the body member 2, having its lower end 7A resting on the surface 3A by lowering with the flexible cord 8 from the top 9 of the handle after the device has penetrated the hay.

Openings 10 are provided in the body member 2 for allowing the circulation of air to the thermometer 7 from the surrounding area.

The point 1 has cutting blades 11 and 12 forming part thereof, the said cutting blades having bevelled cutting edges 11A for cutting into the material. These cutting blades are shaped so that they will cut the fibrous material in either direction of the movement of the point 1 and the handle 5 as it is raised or lowered into the material.

When the device is removed from the material, referring to Figure 1, it leaves an opening 13 within the material which will permit heated air to escape from the material.

I will now describe the operation of my new and improved device for taking temperature of fibrous material or the like. The point 1 is driven down into the material as illustrated in Figure 1, the cutter blades 11 cutting the material so that the body member 2 can enter the hay as well as the handle 5.

The thermometer 7 is then lowered down through the handle by the cord 8 until its lower end 7A rests on the surface 3A. The surrounding air within the fibrous material can enter the body member 2 by way of the openings 10 coming in contact with the thermometer 7. This air is usually of a relatively high temperature.

After the device has been in place a sufficient length of time for the air to cause the thermometer to register the temperature, the said thermometer is raised by the cord 8 and a reading is taken. After this reading has reached or gone beyond the danger point the device is removed from the material and plunged back into the material at several locations, providing openings 13 through which the surrounding air can escape, thereby elminating the necessity of having to move the materials. The temperature readings may be taken throughout the various locations, determining the actual location of the overheated materials.

The cutter blades 11 and 12 cut their way down through the material, cutting the said material so that the device can enter the material and at the same time it will cut the material sufficiently for allowing the opening 13 to remain open without being restricted.

What is claimed is:

A device for forming bores in and testing the temperature of fibrous material comprising a hollow shaft having a tubular body portion and a tapered point removably connected thereto at one end thereof, openings in said tubular body portion adjacent said point, a thermometer removably mounted in said tubular body portion near the openings thereof, a flexible support connected to said thermometer and extending outwardly of said hollow shaft for lowering said thermometer into said shaft adjacent said openings after the shaft has been forced into the mass of fibrous material, an elongated tubular handle portion removably connected to said body portion, and two pairs of blades integral with said tapered point disposed at right angles to each other and longitudinally displaced in relation to each other, said blades being arcuate and sharpened along the length of their arcuate edges to cut the fibrous material both while penetrating and removing so as to form an open bore.

References Cited in the file of this patent

FOREIGN PATENTS

| 190,461 | Switzerland | July 1, 1937 |
| 189,682 | Switzerland | July 16, 1937 |